(12) United States Patent
Spasov

(10) Patent No.: US 10,095,525 B2
(45) Date of Patent: Oct. 9, 2018

(54) METHOD AND APPARATUS FOR FLUSHING INSTRUCTIONS FROM RESERVATION STATIONS

(71) Applicant: Dejan Spasov, Skopje (MK)

(72) Inventor: Dejan Spasov, Skopje (MK)

(*) Notice: Subject to any disclaimer, the term of this patent is extended or adjusted under 35 U.S.C. 154(b) by 18 days.

(21) Appl. No.: 15/821,884

(22) Filed: Nov. 24, 2017

(65) Prior Publication Data
US 2018/0107487 A1 Apr. 19, 2018

Related U.S. Application Data

(60) Provisional application No. 62/561,215, filed on Sep. 21, 2017.

(51) Int. Cl.
*G06F 9/38* (2018.01)
*G06F 9/30* (2018.01)

(52) U.S. Cl.
CPC ........ *G06F 9/3861* (2013.01); *G06F 9/30101* (2013.01)

(58) Field of Classification Search
CPC .................................................. G06F 9/3836
See application file for complete search history.

(56) References Cited

U.S. PATENT DOCUMENTS

| 7,711,935 | B2 | 5/2010 | Singh et al. |
| 8,099,586 | B2 | 1/2012 | Chou et al. |
| 9,489,207 | B2 | 11/2016 | Burky et al. |
| 2010/0169622 | A1* | 7/2010 | Nguyen ............... G06F 9/3863 712/228 |

OTHER PUBLICATIONS

Yeager; Kenneth C. "The Mips R10000 Superscalar Microprocessor," IEEE Micro 16(2):28-40, Apr. 1996.
Ferdman, Mike, CSE502: Computer Architecture (Spring '17), Lecture 7: Speculation and Traps in Out-of-Order Cores, avaliable at: compas.cs.stonybrook.edu/courses/cse502-s17/.

* cited by examiner

*Primary Examiner* — John M Lindlof

(57) ABSTRACT

A processor may include a reorder buffer, reservation stations, and execution units. The reorder buffer may be a circular buffer with a head pointer and a tail pointer, configured to assign indexes to instructions. Reservation stations may be configured to host instructions with the assigned indexes, while waiting to be issued to the execution units. Responsive to exception event, reservation stations may be configured to flush instructions that are younger, in program order, than the instruction executed with exception. Execution units may provide the reorder buffer index EX of the instruction executed with exception. The reorder buffer may provide the reorder buffer index TP stored in the tail pointer. Reservation stations may be configured to flush instructions with assigned indexes in the wrapped-around increasing interval from the index EX to the index TP.

7 Claims, 6 Drawing Sheets

METHOD AND APPARATUS FOR FLUSHING INSTRUCTIONS FROM RESERVATION STATIONS

RELATED APPLICATION

This application claims priority to U.S. Provisional Patent Application No. 62/561,215 filed on Sep. 21, 2017.

BACKGROUND

Field of the Invention

The present invention relates to microprocessors, and more particularly, to efficiently perform recovery from exceptions.

Description of the Related Art

Modern processor microarchitectures implement branch prediction and speculative fetch of instructions from the predicted branch. On misprediction, speculatively fetched instructions need to be flushed from the processor.

A processor may include one or more reservation stations configured to host instructions waiting to be issued to the execution units. On exception event, reservation stations may be configured to flush instructions that are younger, in program order, than the instruction executed with exception. Older instructions may remain in the reservation stations waiting to be executed.

Flushing instructions from the reservation stations may be implemented by assigning flush masks to the hosted instructions. Each bit in the flush mask indicates dependence with prior branch instruction that may initiate flush. This approach leads to complex design solutions that do not scale well with the size of the flush mask. Keeping the flush mask as small as possible, on the other hand, introduces stalls at runtime.

SUMMARY

Method and apparatus for flushing instructions from the reservation stations is contemplated. The embodiments described herein use the tail pointer or the head pointer of a circular buffer to determine the relative age between instructions in the reservation stations and to flush instructions that are younger than the instruction executed with exception.

In one embodiment, a processor may include reorder buffer, one or more reservation stations, and execution units. Reorder buffer assigns indexes to instructions, before they enter the reservation stations. Reservation stations host instructions with the assigned reorder buffer indexes, while waiting to be issued to the execution units. Execution units execute instructions and provide back reorder buffer index of the executed instructions. The reorder buffer is a circular buffer that implements a head pointer and a tail pointer to maintain the beginning and the end of the assigned indexes.

Responsive to exception event that requires flushing instructions, reservation stations may be configured to flush instructions that are younger than the instruction executed with exception. Reservation stations may be configured to receive a first index A and a second index B, and to flush (remove) instructions with assigned indexes in the wrapped-around increasing interval from the first index A to the second index B. Execution units may provide the reorder buffer index EX of the instruction executed with exception as the first index A. The reorder buffer may provide the reorder buffer index TP stored in the tail pointer as the second index B. Reservation stations may be configured to flush instructions with reorder buffer indexes in the wrapped-around increasing interval from the index EX to the index TP (or HP).

DETAILED DESCRIPTION

Figure 1:
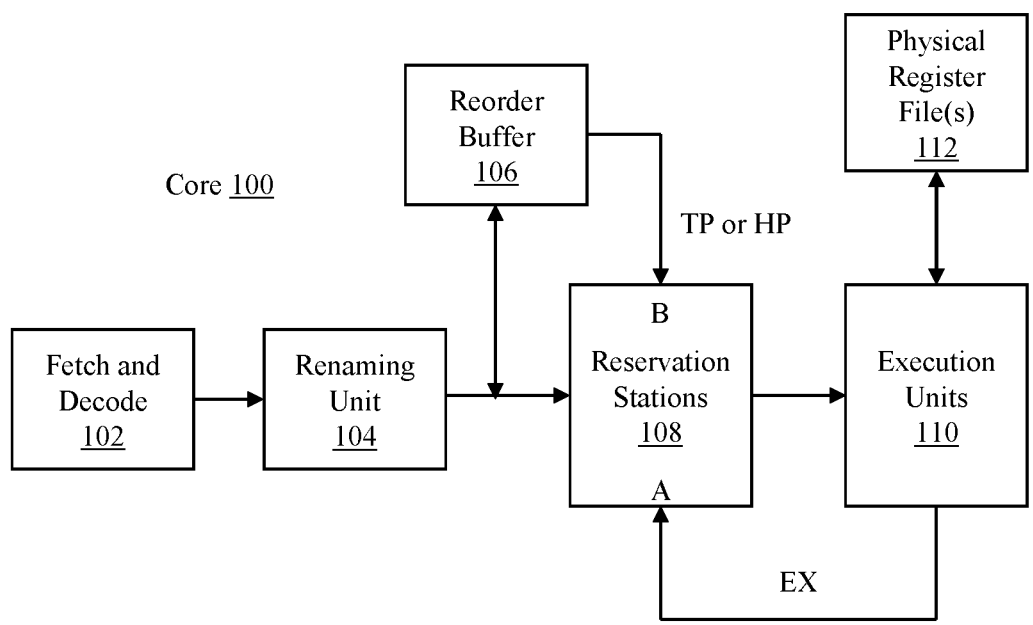
FIG. 1 shows an embodiment of a processor core.

FIG. 1 shows an embodiment of a processor core. The core 100 may include fetch and decode unit 102, renaming unit 104, reorder buffer 106, reservation stations 108, execution units 110, and physical register file 112. The core 100 may include other components and interfaces not shown on FIG. 1 to emphasize the embodiments described herein.

The fetch and decode unit 102 is configured to fetch instructions from memory or L2 cache and to output, in parallel, one or more decoded instructions or instruction micro-operations. The fetch and decode unit 102 may be configured to fetch instructions from any instruction set architecture (e.g. PowerPC™, ARM™, SPARC™, x86™, etc.) and convert them into instruction (micro-)operations that can be executed in the execution units 110. In other embodiments, the fetch and decode unit 102 unit may be split into two or more units, for example fetch unit, decode unit, branch predictor, L1 cache, etc.

The renaming unit 104 is configured to rename source and destination operands to the physical registers of the core 100. The core 100 may include one or more physical register files 112 configured to store speculative results and architecturally visible results.

The reorder buffer 106 is a circular buffer configured to assign indexes to instructions entering the reservation stations 108. For each instruction entering the reservation stations 108, the reorder buffer 106 provides an index in wrapped-around incrementing fashion. The reorder buffer 106 may include a head pointer, to store the index of the oldest in-flight instruction, and a tail pointer, to store the next-in-line for assignment index. Other embodiments may use additional circular structures that assign unique indexes to groups of one or more in-flight instructions.

Reservation stations 108 may comprise of one or more reservation stations, wherein each reservation station may be coupled to one or more execution units 110. Each reservation station may include a plurality of entries configured to host instructions with the assigned indexes. Instructions enter reservation stations 108 in program order, but may be issued to the execution units 110 in any order. Reservation stations 108 may be coupled to the reorder buffer 106 receive the index HP stored in the head pointer or the index TP stored in the tail pointer. The HP index or the TP index may be used to track relative age between instructions in the reservation stations 108.

Execution units 112 may include any number and type of execution units, e.g. branch units, floating point units, load/store units, integer units, etc. Execution units 110 are configured to execute instructions and to return the reorder buffer index of the executed instructions. An instruction may be executed with exception, which may require flushing the core 100. Reservation stations 108 may be configured to flush (remove) instructions that are younger, in program order, than the instruction executed with exception. Older instructions may remain in the reservation stations 108 waiting to be issued. Execution units 110 may be coupled to the reservation stations 108 to provide the reorder buffer index EX of the instruction executed with exception. The reorder buffer 106 may be coupled to the reservation stations 108 to provide the index TP stored in the tail pointer or the index HP stored in the head pointer. Reservation stations 108 may be configured to flush instructions with reorder buffer indexes in the wrapped-around increasing interval from the reorder buffer index EX to the reorder buffer index TP (or HP).

Figure 2:
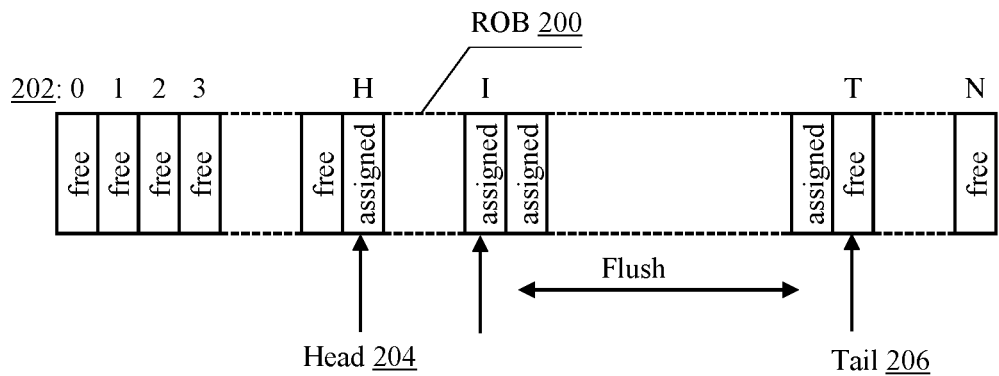
FIG. 2 A and B shows an embodiment of a reorder buffer.
Figure 2:
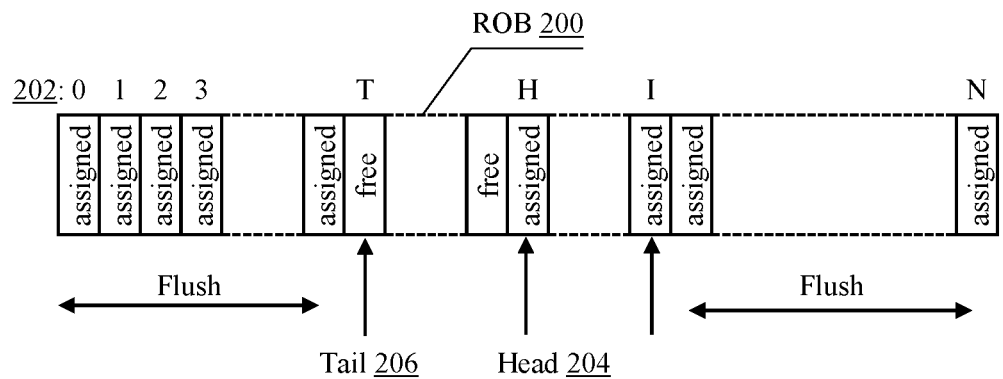

Turning now to FIG. 2 A and B, an embodiment of a reorder buffer is shown. The reorder buffer (ROB) 200 is a circular buffer with a plurality of entries denoted with indexes from 0 to N 202, where the index 0 is considered successor of the index N. For each instruction entering the reservation stations 108 in program order, the reorder buffer 200 allocates an entry and returns the index 202 of the allocated entry. The reorder buffer 200 may include a head pointer 204 and a tail pointer 206 to maintain the beginning and the end of the consecutive interval of allocated entries. The head pointer 204 points to the entry allocated to the oldest in-flight instruction. The tail pointer 206 points to the next-in-line for allocation entry. The tail pointer 206 is incremented with each allocation in wrapped-around incrementing order. The head pointer 204 is incremented with retirement of the instructions. The head pointer 204 or the tail pointer 206 may be used as reference point in determining the relative age between instructions in the reservation stations 108, i.e. the closer, in wrapped-around incrementing order, the assigned index of an instruction to the tail pointer 206 is, the younger the instruction is.

An instruction, e.g. with reorder buffer index I, may be executed with exception. Reservation stations 108 may be configured flush instructions that are younger, in program order, than the instruction executed with exception. Reorder buffer indexes of instructions that are younger than the instruction executed with exception are in the increasing interval from the index I to the index T, which is stored in the tail pointer 206. Reservation stations 108 may be configured to flush instructions in the increasing interval from the index I to the index T. If the index I is larger than the index T (FIG. 2 B), the increasing interval wraps around from the index N to the index 0. Since reorder buffer entries with indexes in the increasing interval from the tail pointer 206 to the head pointer 204 are not associated with in-flight instructions, the flush interval may be defined from the index I to the index H, which is stored in the head pointer 204.

Reservation stations 108 may be configured to compare the index I with the index T. If I<T (FIG. 2 A), reservation stations 108 may be configured to flush instructions with reorder buffer indexes that are larger than the index I and smaller than the index T. If I≥T (FIG. 2 B), reservation stations 108 may be configured to flush instructions with reorder buffer indexes that are larger than the index I or smaller than the index T.

Figure 3:
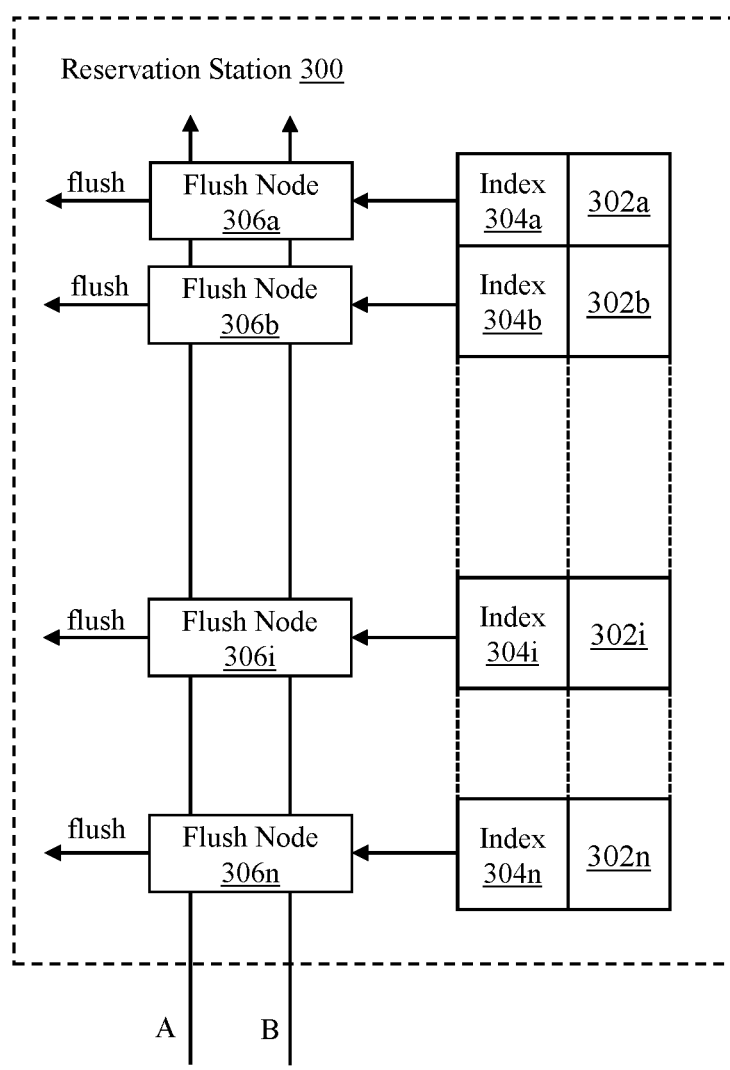
FIG. 3 shows an embodiment of a reservation station.

Turning now to FIG. 3, an embodiment of a reservation station is shown. The reservation station 300 may include a plurality of entries 302a-n, configured to host instructions, and a plurality of flush nodes 306a-n, configured to flush instructions hosted in the entries 302a-n. Each instruction may be hosted with an index, assigned from an interval of indexes from 0 to N, in a circular fashion. Reservation station entries 302a-n may include Index field 304a-n to store the index assigned to the hosted instruction. Flush nodes 306a-n are coupled to the entries 302a-n to receive the value in the Index field 304a-n.

Flush nodes 306a-n are configured to receive a first index A and a second index B and to assert flush signal if the value in the coupled Index field 304a-n is in the wrapped-around increasing interval from the index A to the index B. Asserted flush signal may initiate flush operation for the instruction hosted in the coupled entry 302a-n.

Flush nodes 306a-n are configured to compare the first index A with the second index B. If A<B, each flush node, e.g. 306i, is configured to compare the value in the Index field 304i with the first index A and with the second index B, and to assert flush signal for the entry 302i if the value in the Index field 304i is larger than the index A and smaller than the index B. If A≥B, each flush node, e.g. 306i, is configured to compare the value in the Index field 304i with the first index A and with the second index B, and to assert flush signal for the entry 302i if the value in the Index field 304i is larger than the index A or smaller than the index B.

In one embodiment, reorder buffer index assigned to the hosted instruction may be stored in the Index field 304a-n. Responsive to exception event that requires selectively flushing instructions from the reservation station 300, reorder buffer 106 and execution units 110 may be coupled to the flush nodes 306a-n. Execution units 110 may provide the reorder buffer index EX of the instruction executed with exception as the first index A. The reorder buffer 106 may provide reorder the buffer index TP stored in the tail pointer 206 or the reorder buffer index HP stored in the head pointer 204 as the second index B. Flush nodes 306a-n are configured to flush entries 302a-n with values in the Index field 304a-n in the increasing interval from the index EX to the index TP (or HP).

Figure 4:
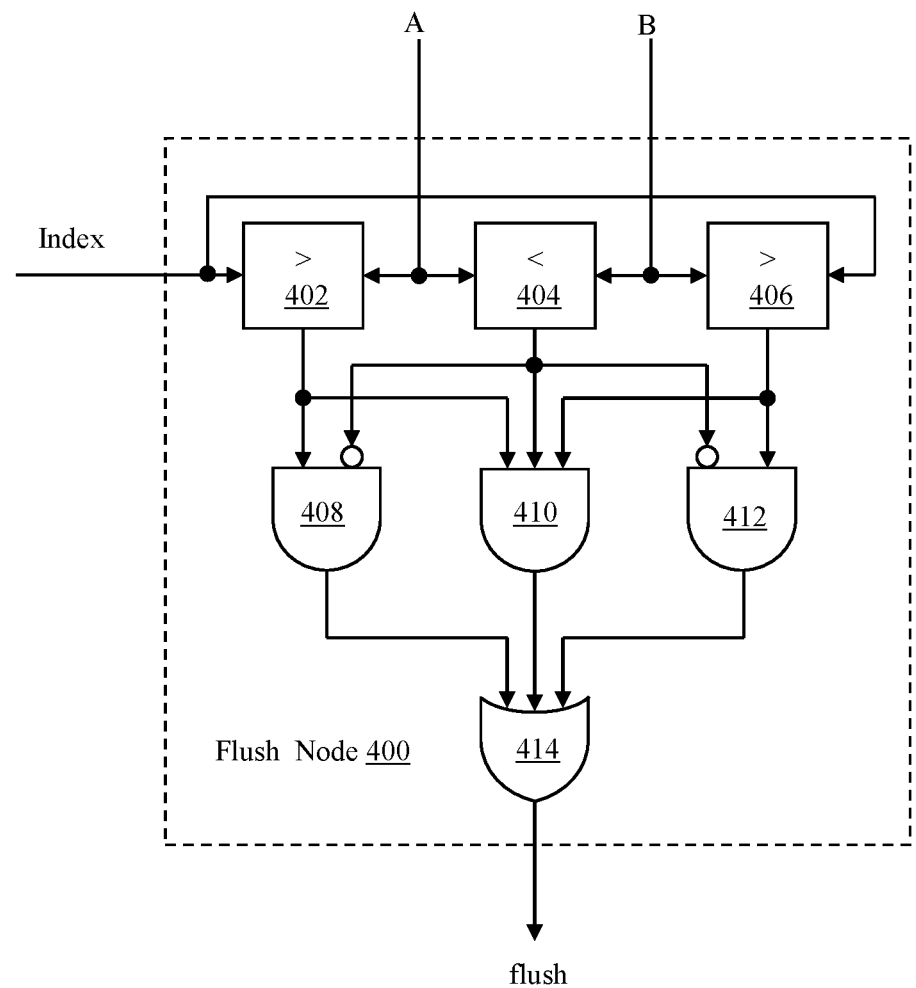
FIG. 4 shows an embodiment of a flush node.

Turning now to FIG. 4, an embodiment of a flush node is shown. The flush node 400 may include comparators 402-406, AND gates 408-412, coupled to the comparators 402-406, and an OR gate 414, coupled to the AND gates 408-412. Those of ordinary skill in the art will appreciate that the hardware may vary depending on the implementation. A reservation station entry, e.g. 302i, is coupled to the flush node 400 to provide the value stored in the Index field 304i. The flush node 400 is configured to receive a first index A and a second index B and to output a flush signal, which may flush the instruction hosted in the reservation station entry 302i.

The comparator 402 may be configured to output 1 if the Index is larger than A, and 0 otherwise. The comparator 404 may be configured to output 1 if A<B, and 0 otherwise. The comparator 406 may be configured to output 1 if the Index is smaller than B, and 0 otherwise. The output from the comparator 404 may be shared among all flush nodes 306a-n.

The AND gate 408 is configured to output 1 if A≥B and the Index is larger than the index A. The AND gate 410 is configured to output 1 if A<B and the Index is larger than A and smaller than B. The AND gate 412 is configured to output 1 if A≥B and the Index is smaller than B. The OR gate 414 is configured to assert the flush signal if at least one of the AND gates 408-412 outputs 1, which indicates that the Index is in a flush interval.

Figure 5:
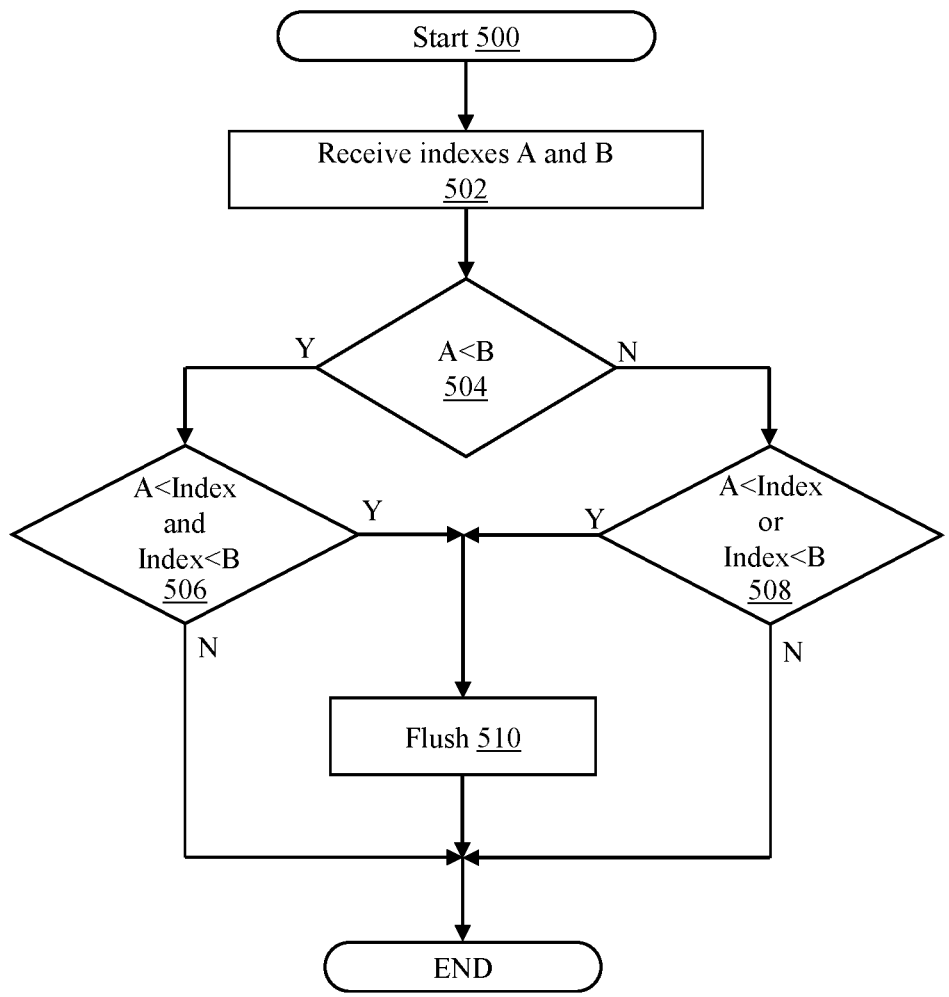
FIG. 5 shows a method for flushing instructions from reservation stations.

Turning now to FIG. 5, a method for flushing instructions from the reservation stations is shown. Reservation stations are configured to host instructions with assigned indexes.

The method 500 begins when a first index A and a second index B are received by the reservation stations (block 502).

The index A is compared with the index B (conditional block 504). If the index A is smaller than the index B (Y branch of 504), assigned index of each instruction is compared with the index A and with the index B to determine if the assigned index is larger than A and smaller than B (conditional block 506). If the assigned index is larger than A and smaller than B (Y branch of 506), the instruction is flushed from the reservation stations (block 510).

If the index A is larger than or equal to the index B (N branch of 504), assigned index of each instruction is compared with the index A and with the index B to determine if the assigned index is smaller than B or larger than A (conditional block 508). If the assigned index is smaller than B or larger than A (Y branch of 508), the instruction is flushed from reservation station entry (block 510).

Figure 6:
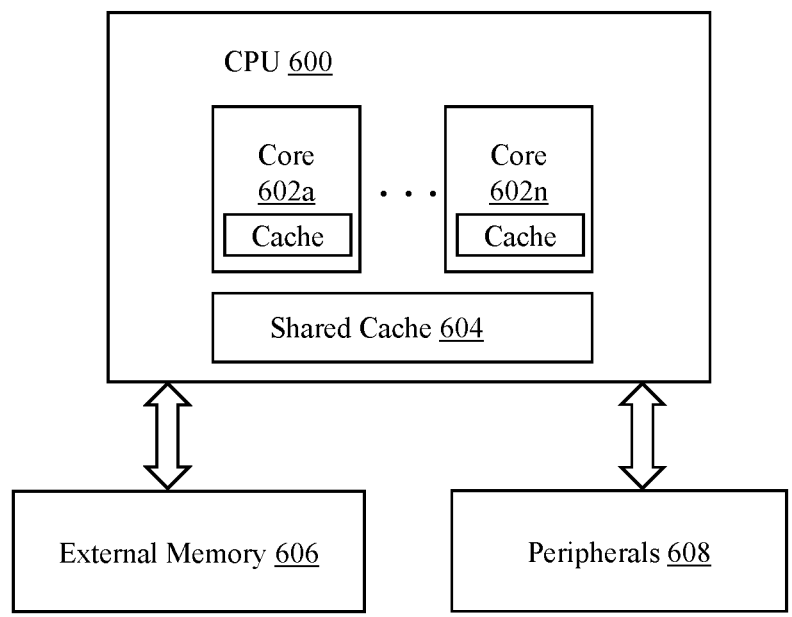
FIG. 6 shows an embodiment of central processing unit in accordance with the embodiments of the present invention.

Referring now to FIG. 6, an embodiment of a central processing unit in accordance with the embodiments of the present invention is shown. It should be obvious to those skilled in the art that the central processing unit 600 may be embodied as a hardware, software, combination of hardware and software, or computer program product, stored on a non-transitory storage media and later used to fabricate hardware comprising the embodiments described herein. The central processing unit 600 may be part of a desktop computer, server, laptop computer, tablet computer, cell or mobile phone, wearable device, special purpose computer, etc. The central processing unit 600 may be included within a system on a chip or integrated circuit, coupled to external memory 606 and peripheral units 608. The CPU 600 may include one or more instances of core processors 602a-n, shared cache 604, interface units, power supply unit, etc. At least one of the core processors 602a-n may include the embodiments described herein. External memory 606 may be any type of memory, such as dynamic random-access memory (DRAM), static random-access memory (SRAM), etc. In some systems, more than one instance of central processing units 600 and/or external memory 608 may be used on one or more integrated circuits. The peripheral unit 608 may include various types of communication interfaces, display, keyboard, etc.

I claim:

1. A processor comprising:
   a reorder buffer configured to assign reorder buffer indexes to instructions entering the processor, wherein the reorder buffer is circular buffer with a head pointer and a tail pointer, wherein the tail pointer is configured to identify a starting index for which reorder buffer indexes are assigned, wherein the head pointer is configured to identify a starting index for which reorder buffer indexes are not assigned;
   execution units;
   one or more reservation stations, wherein each reservation station comprises plurality of entries configured to host instructions waiting to be issued to the execution units and plurality of flush nodes, wherein each entry comprises an index field, wherein each flush node is coupled to an entry, wherein each flush node is configured to:
   receive a first index and a second index;
   receive a value stored in the index field of the coupled entry;
   compare the first index with the second index, to determine if the first index is smaller than the second index;
   compare the first index with the value stored in the index field to determine if the value stored in the index field is larger than the first index;
   compare the second index with the value stored in the index field to determine if the value stored in the index field is smaller than the second index;
   flush instruction hosted in the coupled entry in response to determining that
   the first index is smaller than the second index and the value stored in the index field is larger than the first index and smaller than the second index, or
   the first index is larger than or equal to the second index and the value stored in the index field is larger than the first index or smaller than the second index.

2. The processor as recited in claim 1, wherein the index field of each entry is configured to store a reorder buffer index assigned to an instruction hosted in the entry.

3. The processor as recited in claim 2, wherein in response to exception event, execution units are coupled to the flush nodes to provide a reorder buffer index of an instruction executed with exception as the first index and the reorder buffer is coupled to the flush nodes to provide the tail pointer as the second index.

4. The processor as recited in claim 2, wherein in response to exception event execution units are coupled to the flush nodes to provide a reorder buffer index of an instruction executed with exception as the first index and the reorder buffer is coupled to the flush nodes to provide the head pointer as the second index.

5. A method for flushing instructions from reservation stations, the method comprising:
   assigning indexes to instructions in circular fashion, wherein a tail pointer identifies a starting index for which indexes are assigned and a head pointer identifies a starting index for which indexes are not assigned;
   storing instructions with the assigned indexes in the reservation stations;
   receiving a first index and a second index;
   comparing the first index with the second index, to determine if the first index is smaller than the second index;
   comparing assigned indexes of each instruction with the first index, to determine which of the assigned indexes are larger than the first index;
   comparing assigned indexes of each instruction with the second index, to determine which of the assigned indexes are smaller than the second index;
   if the first index is smaller than the second index, flushing each instruction with assigned index that is larger than the first index and smaller than the second index;
   if the first index is larger than or equal to the second index flushing each instruction with assigned index that is larger than the first index or smaller than the second index.

6. The method as recited in claim 5, wherein in response to exception event an assigned index of an instruction executed with exception is provided as the first index and the head pointer is provided as the second index.

7. The method as recited in claim 5, wherein in response to exception event an assigned index of an instruction executed with exception is provided as the first index and the tail pointer is provided as the second index.

* * * * *